US012664810B1

(12) United States Patent

Mercado et al.

(10) Patent No.: US 12,664,810 B1
(45) Date of Patent: *Jun. 23, 2026

(54) AUTOMATED SYSTEM AND METHOD FOR ELECTRONIC DOCUMENT TYPE IDENTIFICATION AND VALIDATION

(71) Applicant: MH SUB I, LLC, El Segundo, CA (US)

(72) Inventors: Marjo Fernandez Mercado, Los Angeles, CA (US); Yaohan Ke, Yorba Linda, CA (US); Ritika Joshi, Glendale, CA (US)

(73) Assignee: MH SUB I, LLC, El Segundo, CA (US)

( * ) Notice: Subject to any disclaimer, the term of this patent is extended or adjusted under 35 U.S.C. 154(b) by 405 days.

This patent is subject to a terminal disclaimer.

(21) Appl. No.: 17/832,514

(22) Filed: Jun. 3, 2022

(51) Int. Cl.
| | |
|---|---|
| *G06V 30/412* | (2022.01) |
| *G06F 16/93* | (2019.01) |
| *G06F 40/226* | (2020.01) |
| *G06V 10/70* | (2022.01) |
| *G06V 30/416* | (2022.01) |

(52) U.S. Cl.
CPC ............ *G06V 30/412* (2022.01); *G06F 16/93* (2019.01); *G06F 40/226* (2020.01); *G06V 10/87* (2022.01); *G06V 30/416* (2022.01)

(58) Field of Classification Search
CPC .... G06V 30/412; G06V 10/87; G06V 30/416; G06F 16/93; G06F 40/226
See application file for complete search history.

(56) References Cited

U.S. PATENT DOCUMENTS

| | | | |
|---|---|---|---|
| 2018/0033147 A1* | 2/2018 | Becker ................ | G06V 30/412 |
| 2019/0155944 A1* | 5/2019 | Mahata ............... | G06F 16/9024 |
| 2019/0205636 A1* | 7/2019 | Saraswat .............. | G06F 16/254 |
| 2020/0097717 A1* | 3/2020 | Young ................. | G06V 30/416 |
| 2020/0210573 A1* | 7/2020 | Chistyakov ........... | G06F 21/561 |
| 2021/0183526 A1* | 6/2021 | Bader .................... | G06N 5/022 |
| 2021/0209551 A1* | 7/2021 | Navarra ............... | G06F 40/279 |
| 2021/0217154 A1* | 7/2021 | Tang ...................... | G06T 7/001 |
| 2023/0120865 A1* | 4/2023 | Nascimento ..... | G06V 30/19113 |
| | | | 705/44 |

* cited by examiner

*Primary Examiner* — Amandeep Saini
*Assistant Examiner* — Andrew S Budisalich
(74) *Attorney, Agent, or Firm* — Rutan & Tucker, LLP

(57) ABSTRACT

Various embodiments of the disclosure are directed to an Automated electronic Document Identification and Validation (ADIV) system and method. In the ADIV system, received via an API, words and phrases may be extracted from the document content, and Machine Learning (ML) models may be used to classify the document type. The extracted words/phrases are parsed, and key value pairs of data may be extracted. Word embedding vectors (WEVs) may be generated for the extracted words and phrases and for the keywords and key phrases. The cosine distances between the WEVs of the keywords and key phrases the WEVs of the extracted words and phrases are calculated. The key value pairs are identified based on the minimum cosine distance. The key value pairs may be used with one or more rules based models to determine document validity.

20 Claims, 8 Drawing Sheets

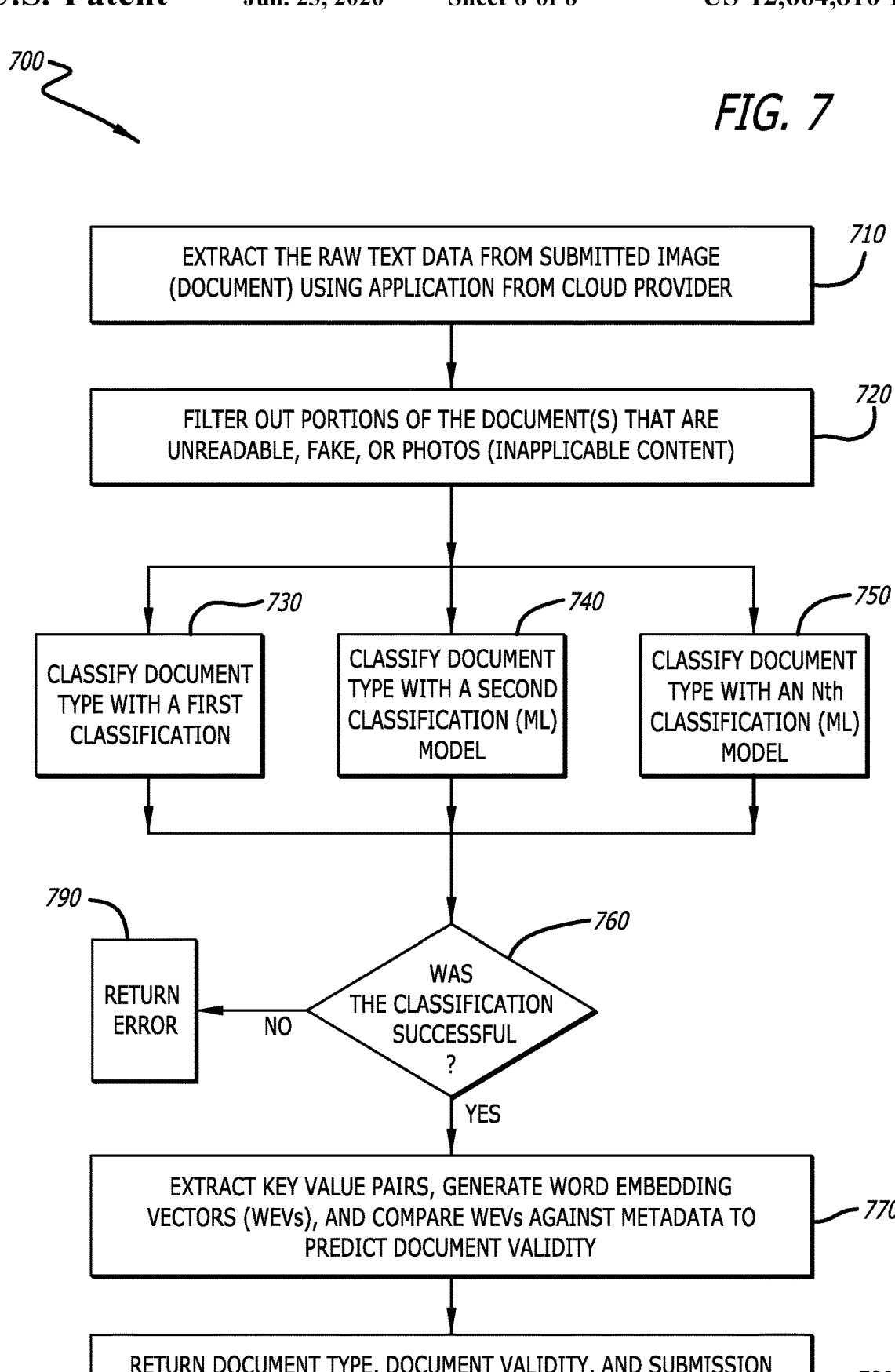

EXTRACT THE RAW TEXT DATA FROM SUBMITTED IMAGE (DOCUMENT) USING APPLICATION FROM CLOUD PROVIDER — 710

FILTER OUT PORTIONS OF THE DOCUMENT(S) THAT ARE UNREADABLE, FAKE, OR PHOTOS (INAPPLICABLE CONTENT) — 720

730 — CLASSIFY DOCUMENT TYPE WITH A FIRST CLASSIFICATION

740 — CLASSIFY DOCUMENT TYPE WITH A SECOND CLASSIFICATION (ML) MODEL

750 — CLASSIFY DOCUMENT TYPE WITH AN Nth CLASSIFICATION (ML) MODEL

790 — RETURN ERROR

NO

760 — WAS THE CLASSIFICATION SUCCESSFUL?

YES

EXTRACT KEY VALUE PAIRS, GENERATE WORD EMBEDDING VECTORS (WEVs), AND COMPARE WEVs AGAINST METADATA TO PREDICT DOCUMENT VALIDITY — 770

RETURN DOCUMENT TYPE, DOCUMENT VALIDITY, AND SUBMISSION ACKNOWLEDGEMENT MESSAGE (SUCCESS/ERROR) TO APPLICATION — 780

AUTOMATED SYSTEM AND METHOD FOR ELECTRONIC DOCUMENT TYPE IDENTIFICATION AND VALIDATION

FIELD

Embodiments of the disclosure relate to the field of Automated, Document Identification and Validation (ADIV). More specifically, an aspect of the invention relates to a system and a method for automatically determining, through machine-learning techniques, electronic document type and the validity of such electronic documents.

GENERAL BACKGROUND

In the United States, a vast number of private and governmental entities have been formulated to provide services to individuals. Sometimes, these services are predicated on the acquisition of different types of documents prior to the performance of such services, prior to commencement of service, or issuance of an entitlement, which may involve an identification, a financial instrument, or a permission. For example, the entitlement may include, but is not limited or restricted to, a governmental identification (e.g., passport, driver's license, state identification, etc.), a credit card, a secured loan (e.g., mortgage, home equity loan, home equity line of credit, automotive loan, etc.), a rental lease, or the like. Prior to issuance and acquisition of the entitlement, the providers may request documents from the individual to verify certain facts surrounding him or her.

For example, secured loans may require documents that support information set forth in a loan application. Normally, the documents are gathered by the applicant and manually processed by the lender. Such documents may provide evidence of employment, income, assets, and/or liabilities. For a lender, the manual processing of the documents is quite costly and labor-intensive, as it requires a human to review the document and verify whether that document satisfies prescribed requirements to constitute a valid document. The manual processing of the documents is further prone to errors and obviates any financial benefit from economies of scale that could be realized by the applicant and/or the lender. Accordingly, there is a need for an automated document identification and validation system.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 4 is an exemplary block diagram of a validation subsystem associated with the ADIV system of FIG. 2.

FIG. 7 is an exemplary flowchart of the operations of the ADIV system of FIG. 1 conducting pre-processing operations based on concurrent machine-learning (ML) model analytics.

DETAILED DESCRIPTION

Figure 1:
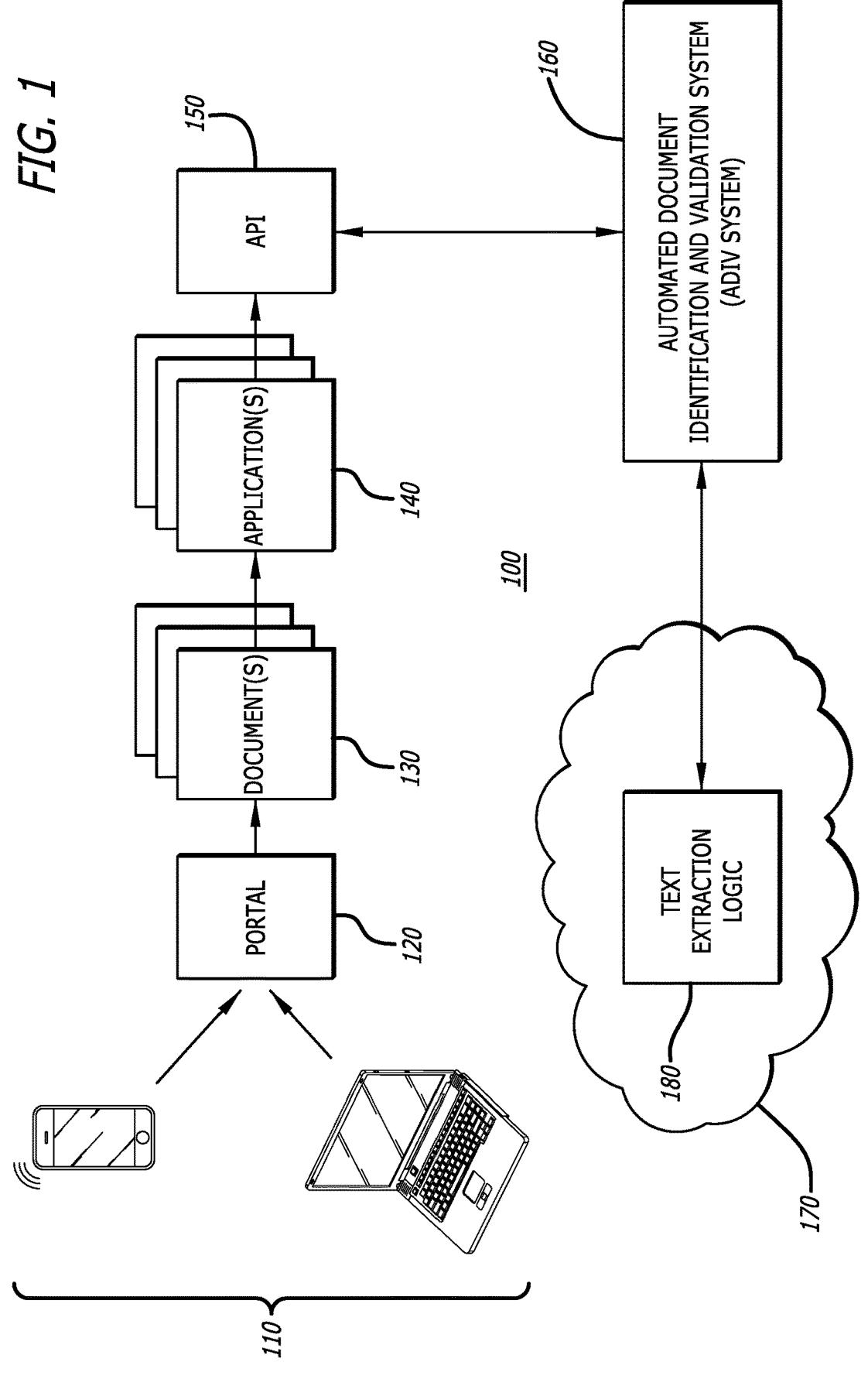
FIG. 1 is an exemplary block diagram of a document review platform including an Automated Document Identification and Validation (ADIV) system communicatively coupled to an application instance accessible by computing devices.

Various embodiments of the disclosure are directed to an Automated Document Identification and Validation (ADIV) system and method. In general, the identification and validation of a document may begin with a user submitting the document, typically an electronic image (e.g., an array of brightness values for pixels forming the image), from a computer or other device through a portal that provides access to an application. The submission may be made by way of a public network (e.g., the Internet) or some other type of network. The application may route the document through an Application Programming Interface (API) to the ADIV system for processing. Words and phrases may be extracted from the document content. One or more Machine Learning (ML) models may be used to classify the document type. The sorts of documents to be classified may include, but are not limited to, pay stubs, bank statements, driver's licenses, passports, leases, mortgages, contracts, etc.

Once classified, the extracted words and phrases are parsed, and key value pairs of data may be extracted. Key value pairs may be treated as delimiters and may flag locations where specific data may be found in the extracted text. A list of keywords and key phrases may be supplied that are appropriate to the type of classification of the instant document. Word embedding vectors (WEVs) may be generated for the extracted words and phrases and for the keywords and key phrases. The cosine distance of the WEVs of the keywords and key phrases is calculated with the WEVs of the extracted words and phrases. The key value pairs are identified as the extracted words and phrases of which the minimum cosine distance is less than a prescribed threshold with respect to the keywords and key phrases. In some embodiments, the prescribed threshold may be +0.2 (a cosine distance may range from 0 to +2).

The key value pairs may be used with metadata associated with the document and one or more rules based models to determine document validity. In some embodiments, dates may be extracted from between key value pairs related to dates that may be relevant to the document type. The recency of the document may be determined with respect to either the submission date and/or the current date (which may be the same date). In other embodiments, various data and metadata may be used in the validation process. The original classification may be confirmed and sent, along with the validation back to the initial application through the API.

I. Terminology

In the following description, certain terminology is used to describe aspects of the invention. For example, in certain situations, the term "logic" is representative of hardware, firmware, or software that is configured to perform one or more functions. As hardware, logic may include circuitry having data processing or storage functionality. Examples of such circuitry may include, but are not limited or restricted to, a hardware processor (e.g., a microprocessor with one or more processor cores, a digital signal processor, a programmable gate array, a microcontroller, an application specific integrated circuit "ASIC," etc.), a semiconductor memory, or combinatorial elements.

Alternatively, logic may be software, such as executable code in the form of an executable application, an Application Programming Interface (API), a subroutine, a function, a procedure, an applet, a servlet, a routine, source code, object code, a shared library/dynamic library, or one or more instructions. The software may be stored in any type of a suitable non-transitory storage medium or transitory storage medium (e.g., electrical, optical, acoustical, or other forms of propagated signals such as carrier waves, infrared signals, or digital signals). Examples of the non-transitory storage medium may include, but are not limited or restricted to, a programmable circuit; semiconductor memory; non-persistent storage such as volatile memory (e.g., any type of random access memory "RAM"); or persistent storage such as non-volatile memory (e.g., read-only memory "ROM," power-backed RAM, flash memory, phase-change memory, etc.), a solid-state drive, hard disk drive, an optical disc drive, or a portable memory device. As firmware, the executable code may be stored in persistent storage.

The term "computing device" should be construed as electronics with the data processing capability and/or a capability of connecting to any type of network, such as a public network (e.g., Internet), a private network (e.g., a wireless data telecommunication network, a local area network "LAN," etc.), or a combination of networks. Examples of a computing device may include, but are not limited or restricted to, the following: a server, an endpoint device (e.g., a laptop, a smartphone, a tablet, a desktop computer, a netbook, a medical device, or any general-purpose or special-purpose, user-controlled electronic device); a mainframe; a router; or the like.

A "message" generally refers to information transmitted in one or more electrical signals that collectively represent electrically stored data in a prescribed format. Each message may be in the form of one or more packets, frames, HTTP-based transmissions, or any other series of bits having the prescribed format.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B, or C" or "A, B, and/or C" mean "any of the following: A; B; C; A and B; A and C; B and C; A, B, and C." An exception to this definition will occur only when a combination of elements, functions, steps, or acts are in some way inherently mutually exclusive.

II. Automated Document Identification and Validation System and Method

Referring to FIG. 1, an exemplary block diagram of a document review platform including an automated document type identification and validation (ADIV) system communicatively coupled to an application instance accessible by computing devices is shown. Document review platform 100 may comprise any of a variety of computing devices 110 that may be used to access the platform. Computing devices 110 may be communicatively coupled to a portal 120 through the Internet or some other network. The portal itself may be a web page or some other access point. The user may upload one or more documents 130 to be identified or verified.

One or more applications 140 may be present to access the document(s) 130. Typically, the user may specify the application or applications 140 to process the documents. The sorts of documents to be identified and verified may include, but are not limited to, pay stubs, bank statements, driver's licenses, passports, leases, mortgages, contracts, etc. The documents may be appropriate for the application(s) 140 being employed. Typical application(s) 140 may include, but are not limited to, bank loan and/or mortgage applications, employment applications, renewal of government-issued identifications, car or equipment rental agreements, and the like.

The application(s) 140 may preprocess document(s) 130 in various ways. For example, a filter may be applied to remove inappropriate content. For example, blank documents, photographs, vulgar content, and unreadable documents, etc., may be rejected at this point. When ready, the document(s) 130 may be presented to the Automated Document Identification and Validation (ADIV) system 160 through Application Programming Interface (API) 150. API 150 may be a software library of routines that may be included in application(s) 140 to allow direct access to the ADIV system in a manner transparent to the users of computational devices 110.

Once the document(s) 130 have been submitted to ADIV system 160, text extraction may be performed. This may be necessary because the document(s) 130 submitted may be in image format, and it may be done by any method known in the art. In the embodiment of document review platform 100, a cloud computing 170 application text extraction logic 180 may be used. Once the characters in document(s) 130 have been identified, they are converted to words and phrases for further processing by ADIV system 160.

Figure 2:
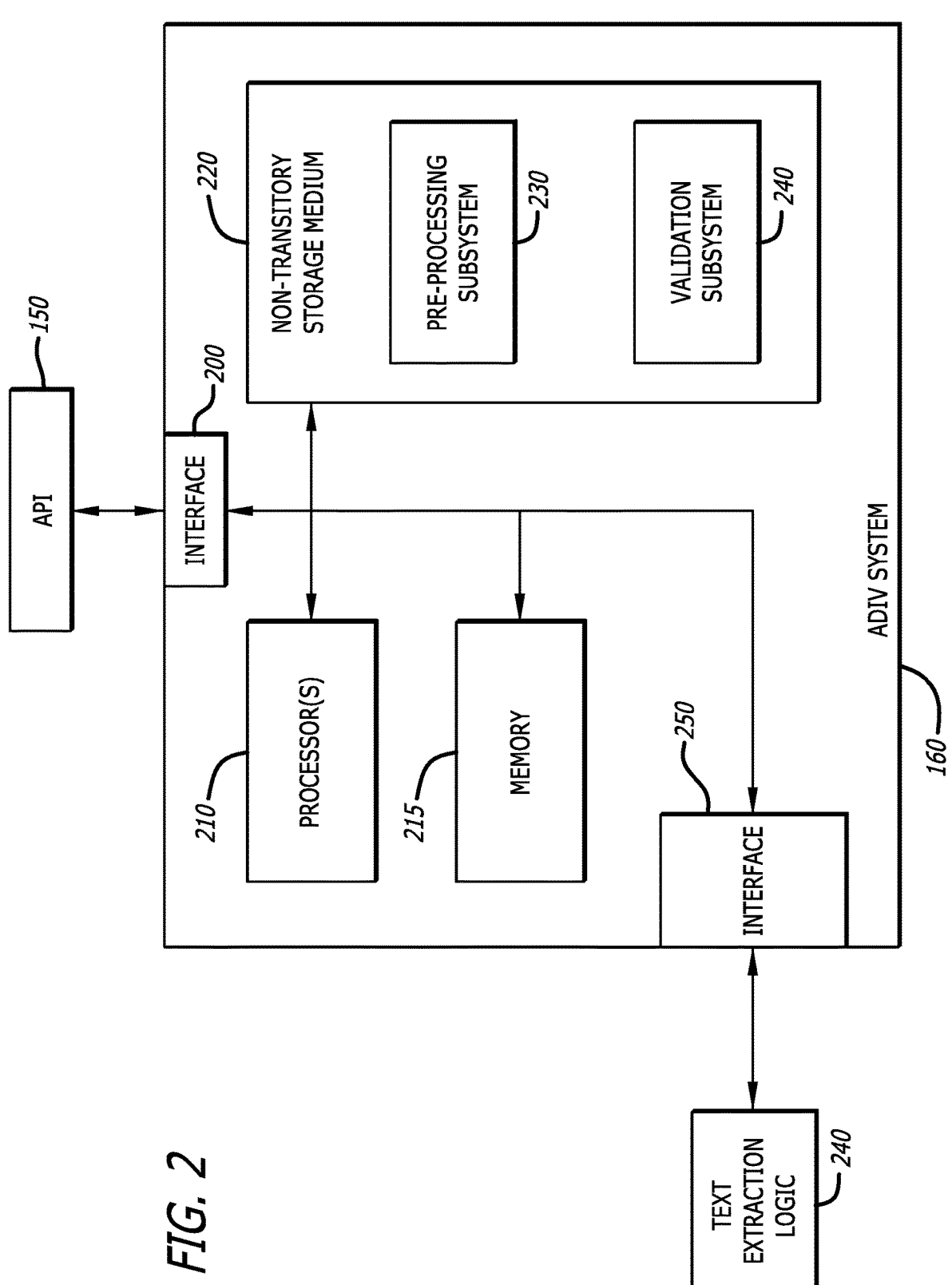
FIG. 2 is an exemplary block diagram of the ADIV system of FIG. 1.

Referring to FIG. 2, an exemplary block diagram of the ADIV system of FIG. 1 is shown. The automated document ADIV system 160 may be coupled to API 150 by interface 200 and to text extraction logic 180 by interface 250. The operation of interfaces 200 and 250 have been discussed indirectly above in conjunction with API 150 and text extraction logic 180 in FIG. 1, though it should be noted that interface 200 may be where the results of the identification and validation operations will be returned to API 150.

ADIV system 160 further comprises one or more processors 210 and associated memory 215, which may be used to execute the machine-readable instructions stored in non-transitory storage medium 220. Non-transitory storage medium 220 may further comprise pre-processing subsystem 230 and validation subsystem 240.

Figure 3A:
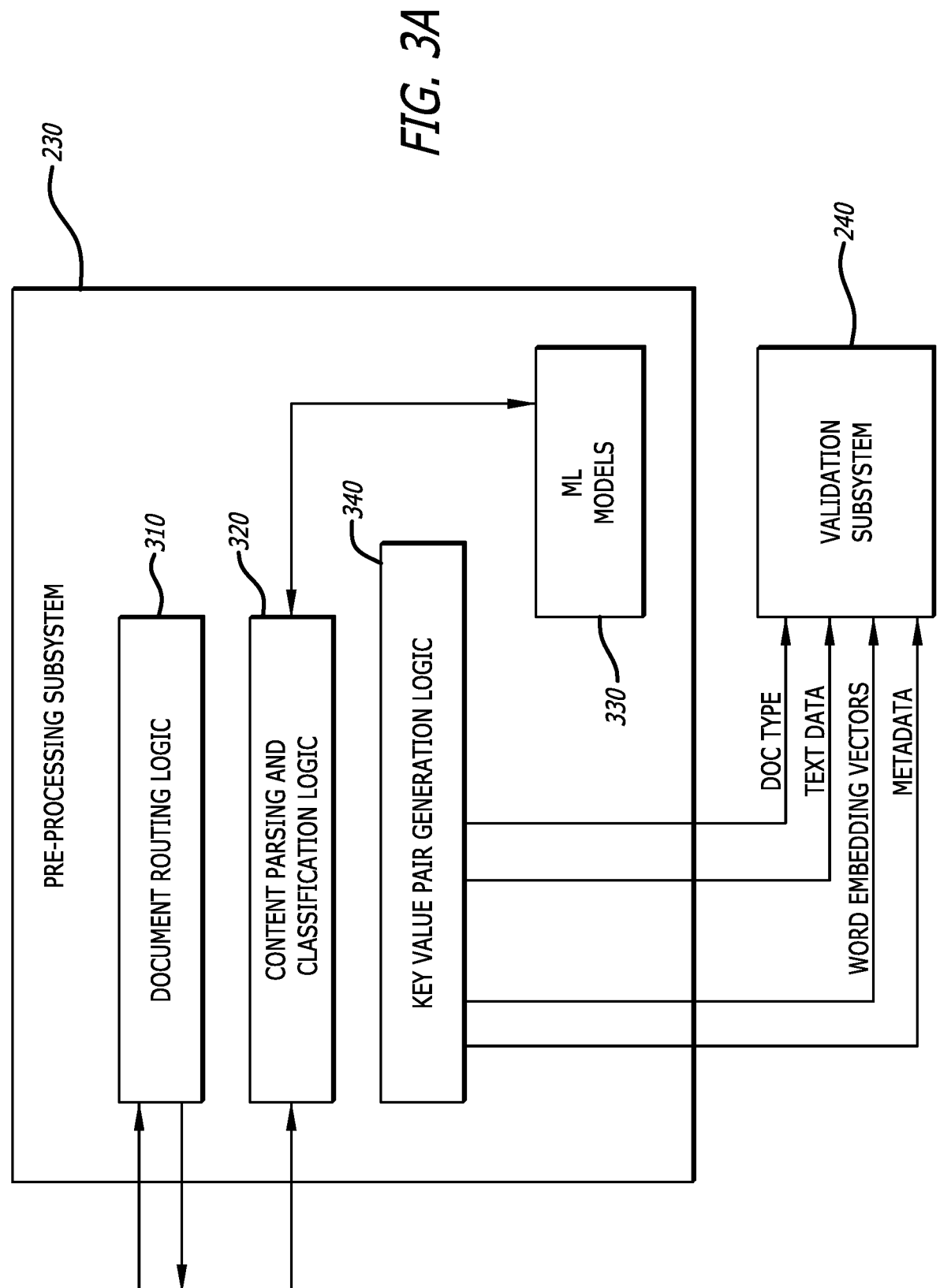
FIG. 3A is an exemplary block diagram of pre-processing subsystem associated with the ADIV system of FIG. 2.

Referring to FIG. 3A, an exemplary block diagram of pre-processing subsystem associated with the ADIV system of FIG. 2 is shown. Pre-processing subsystem 230 may comprise document routing logic 310. Document routing logic 310 may be responsible for tracking the activity internal to ADIV system 160. This may include tasks such as acknowledging the receipt of documents, providing status in response to a query, and returning the results of the ADIV system 160 through API 150.

Pre-processing subsystem 230 may further comprise content parsing and classification logic (CPCL) 320. CPCL 320 may take the extracted words and phrases from text extraction logic 180, parse them, and pass them to Machine Learning (ML) models 330. The ML models 330 may be run at least in part on an integrated circuit optimized (e.g., a Graphical Processing Unit or GPU) or programmed (e.g., a Field Programmable Gate Array or FPGA) for running ML models.

ML models 330 may have been trained on known documents of the types to be classified. Once trained, the ML models 330 may be evaluated on a set of known validation documents to verify the ML models 330 are functioning correctly. The process may be repeated as often as necessary to train, update, and improve the ML models 330. Typically, the model training process may be performed prior to the deployment of the ML models 330.

Figure 3B:
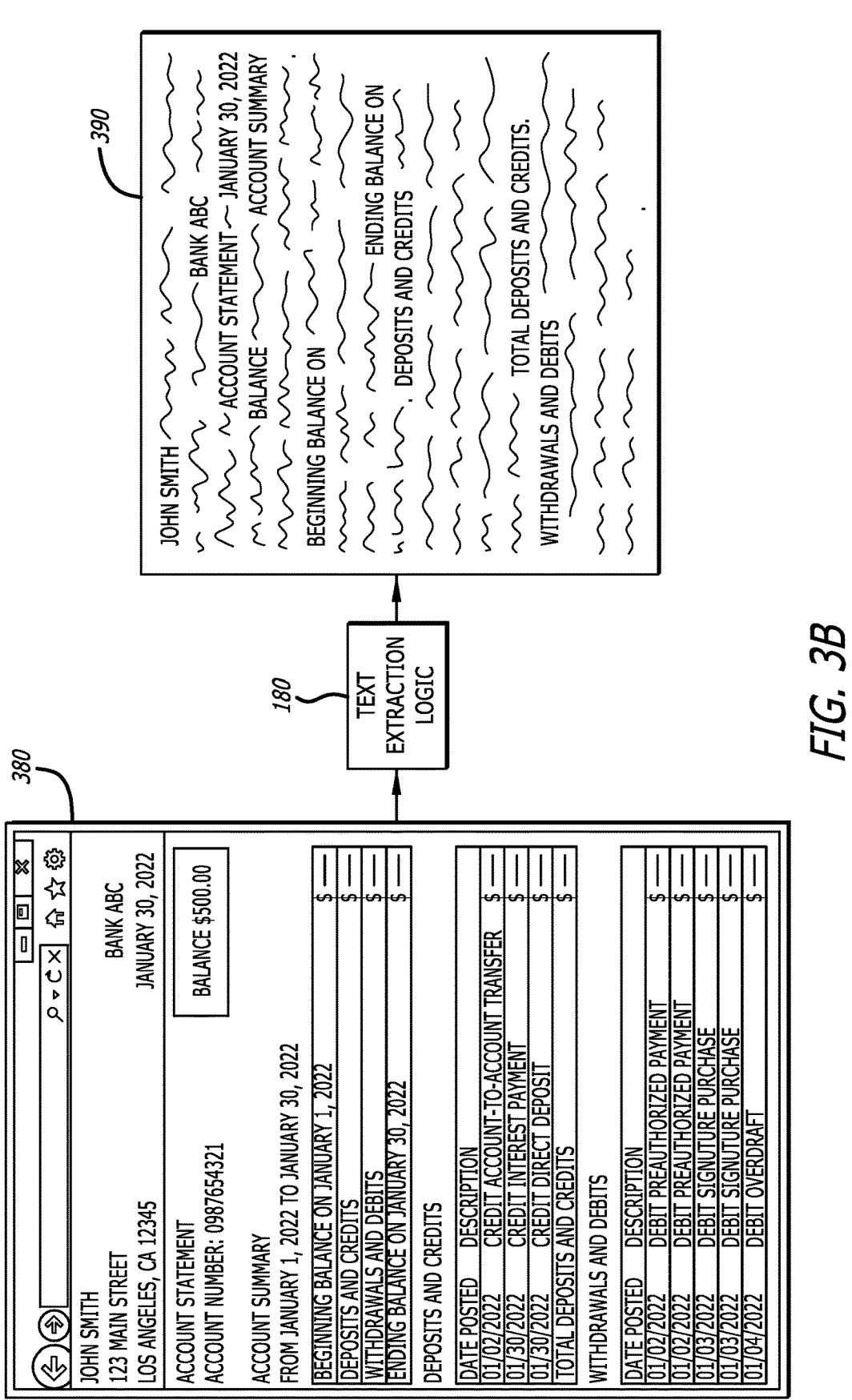
FIG. 3B is an exemplary diagram of a text conversion of an image of a document submitted by a computing device for type identification by the pre-processing subsystem associated with the ADIV system of FIG. 2.

Referring to FIG. 3B, an exemplary diagram of a text conversion of an image of a document submitted for type identification by the pre-processing subsystem associated with the ADIV system of FIG. 2 is shown. The original exemplary document image 380 is present in the figure. In this example, the document may be a bank statement, though any sort of document may be processed. Document image 380 may be passed through text extraction logic 180, and extracted text document 390 may be the result.

Extracted text document 390 may comprise a plurality of words and/or phrases that are similar to documents of its type. Some examples may be shown explicitly in the figure, like, for example, the customer's name JOHN SMITH, the financial institution BANK ABC, the date, the document type ACCOUNT STATEMENT, the ACCOUNT NUMBER, and so on. The remainder of the document is shown as squiggles to highlight the important words and phrases to be identified, but the squiggles may also include text and numbers as extracted by text extraction logic 180.

Returning to FIG. 3A, the extracted text document 390 may be presented to ML models 330 (not shown, see FIG. 3A) for classification, and the ML models 330 return the classification of the document to CPCL 320. In addition, metadata about the user may also be extracted by CPCL 320. Metadata may be data like the user's name, address, employer, age, etc., depending upon the type of document.

The extracted text document 390 (not shown, see FIG. 3B) may be passed to key value pair generation logic 340. In some embodiments, a list of key phrases for each document type to be classified may be provided prior to processing. The list of key phrases may be selected according to the document classification by CPCL 320. Each key phrase may comprise one or more words. The word embedding vectors for the key phrases may also be generated and provided. This may be done by means of a neural network, a machine learning model, or some other method.

A word embedding vector (WEV) may be a multi-dimensional representation of the meaning of the key phrase in an abstract multi-dimensional vector space. For example, a vector $\vec{V_K}$ in an n-dimensional vector space can be represented as:

$$\vec{V_K} = (X_1, X_2, X_3, \ldots X_i, \ldots X_n)$$

where $X_i$ is the magnitude in the $i^{th}$ dimension. The word embedding vectors of the words and phrases extracted from the document being identified (e.g., extracted text document 390, not shown) may also be generated.

The cosine distance between the WEVs of the key phrases and the WEVs of the extracted words and phrases may be calculated. The cosine distance $D_C$ is defined as:

$$D_C = 1 - S_C$$

where $S_C$ is the cosine similarity defined as:

6

$$S_C = \frac{\vec{A} \cdot \vec{B}}{\|A\| \|B\|} = \frac{\sum_{i=1}^{n} A_i B_i}{\sqrt{\sum_{i=1}^{n} A_i^2} \sqrt{\sum_{i=1}^{n} B_i^2}} = \cos\theta$$

where $\vec{A} \cdot \vec{B}$ is the vector dot product of the vectors $\vec{A}$ and $\vec{B}$, $\theta$ is the angle between them, and $\|A\|$ and $\|B\|$ are the magnitudes of $\vec{A}$ and $\vec{B}$, respectively. Since $S_C$ can range from −1 to +1, $D_C$ can range from 0 to +2. The lower the value of $D_C$, the closer $\theta$ is to 0. The extracted words and phrases of which the cosine distance is less than a prescribed threshold with respect to the key phrases are identified as the key value pairs. In certain embodiments, the prescribed threshold may be +0.2.

Conceptually, each vector may originate at the origin point of the n-dimensional vector space. Thus all vectors in the space may intersect each other at that point. The values of any two vectors may define two other points in the vector space. Regardless of the number of dimensions, those three points may define a two-dimensional plane, and the angle $\theta$ is the angle between the two vectors in that plane. Note that the magnitudes of the vectors may not matter, just the angle between them.

The reasoning may be that any two WEVs in a closely related direction are likely to have closely related meanings, and, in particular, words and phrases that are closely related to key phrases on the list may be likely to be the equivalent of that key phrase in the document being identified. Once the key value pairs for the classified document have been generated, the document type, the text data (e.g., extracted text document 390), the WEVs for the key value pairs, and any metadata extracted are sent to validation subsystem 240.

Figure 4:
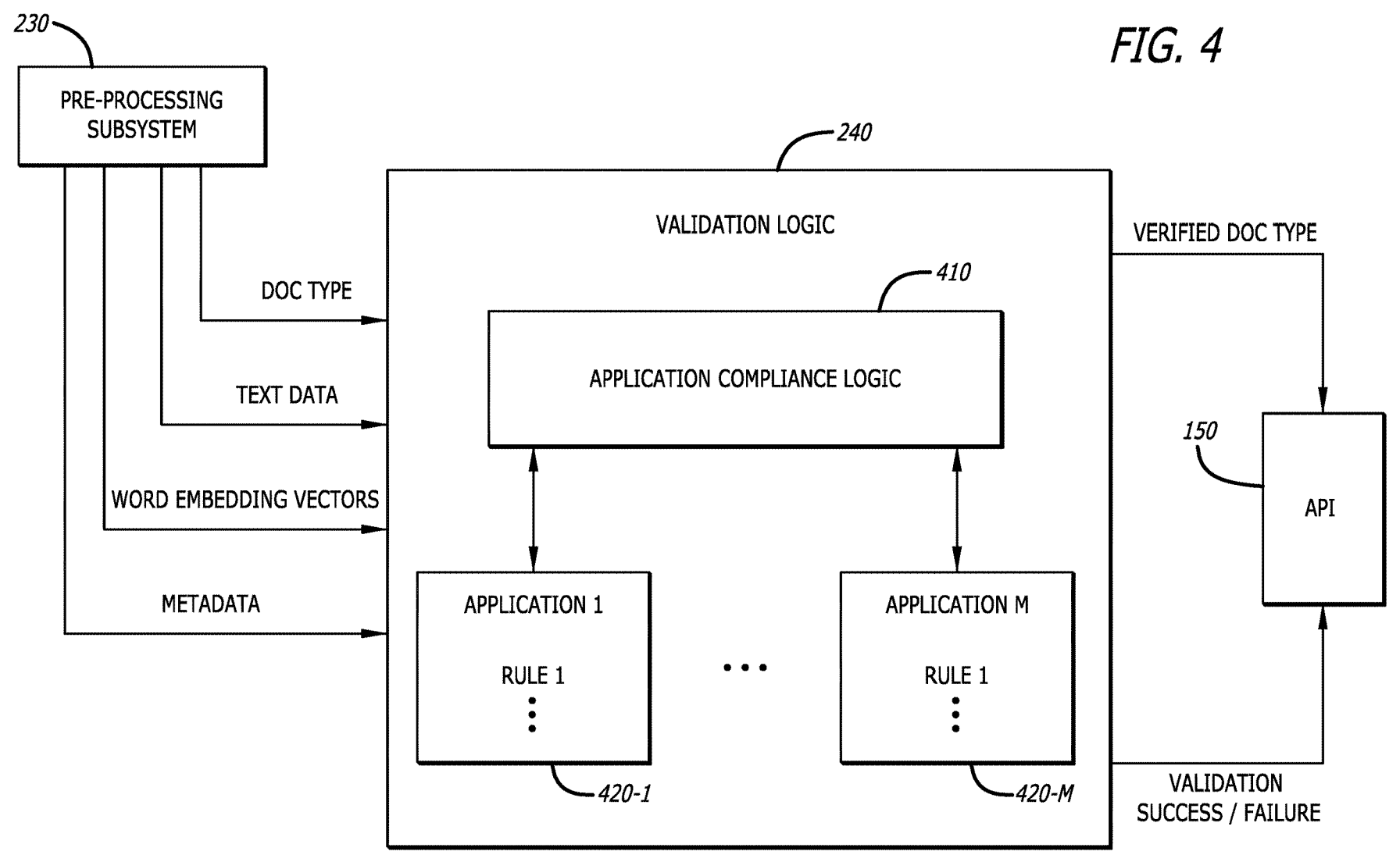

Referring to FIG. 4, an exemplary block diagram of a validation subsystem associated with the ADIV system of FIG. 2 is shown. Validation subsystem 240 comprises application compliance logic 410 and one or more rules based models 420-1 through 420-M corresponding to the issuing application 140 (not shown, see FIG. 1). The document type, the text data (e.g., extracted text document 390, not shown), the WEVs for the key value pairs, and any metadata extracted are sent to the model(s) associated with the issuing application, which then applies its rules to determine if the document is a valid instance of its type as classified by ML models 330 (not shown, see FIG. 3A).

The rules based model(s) 420-1 through 420-M selected return either success or failure of the validation process as well as verifying the document classification originally performed by ML models 330 (not shown). These results are returned to the issuing application 140 (not shown) by means of API 150.

Figure 5:
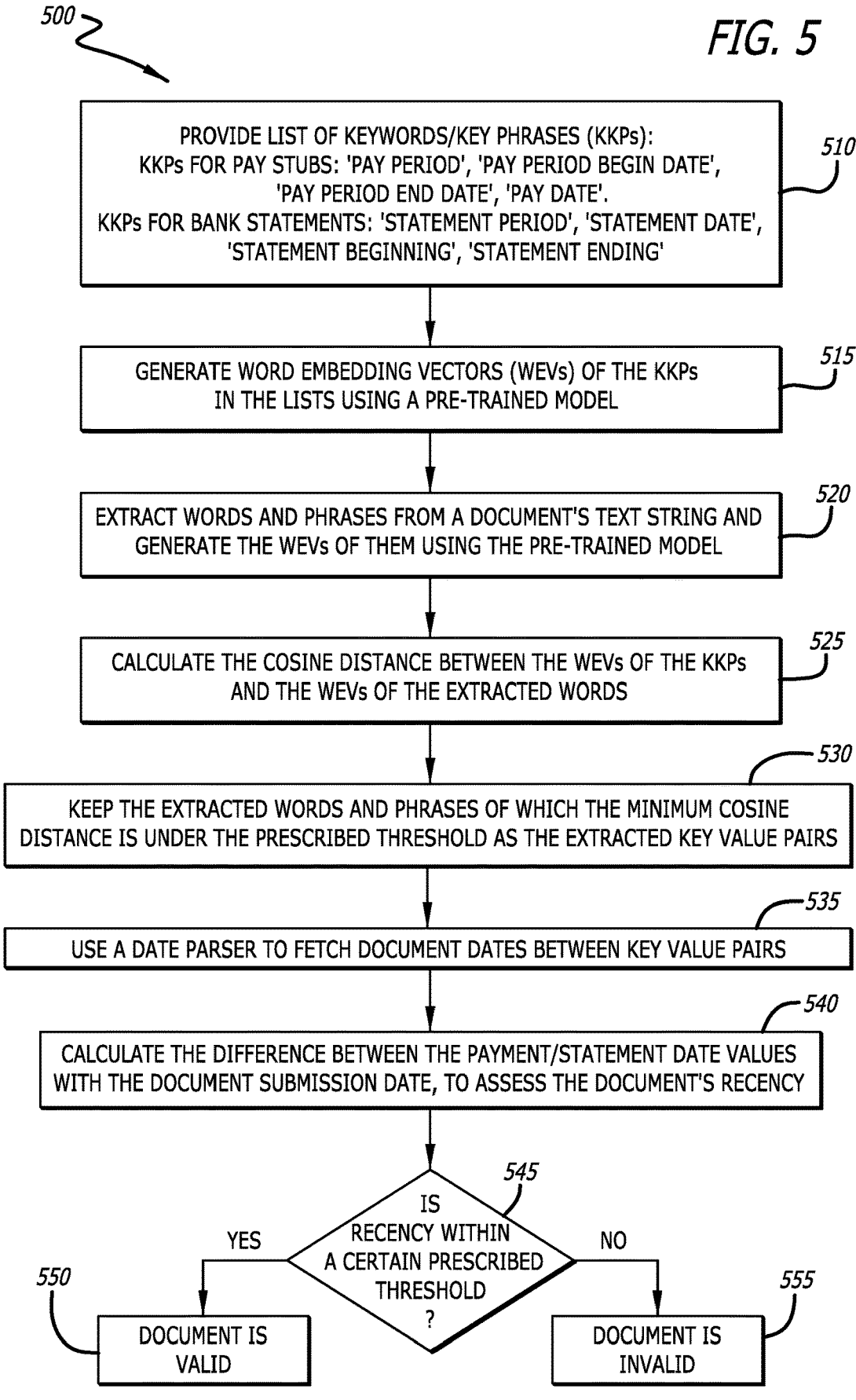
FIG. 5 is an exemplary flowchart of validation operations conducted by the pre-processing subsystem and the validation subsystem of FIGS. 3A & 4.

Referring to FIG. 5, an exemplary flowchart of validation operations conducted by the pre-processing subsystem and the validation subsystem of FIGS. 3A & 4 is shown. Process 500 may begin by providing a list of keywords and key phrases for the various types of documents to be validated (block 510). For example, if pay stubs are being validated, keywords/phrases might be "pay period," "pay period begin date," "pay period end date," "pay date," etc. If bank statements are being validated, keywords/phrases might be, for example, "statement period," "statement date," "statement beginning," "statement ending," etc. If government identifications (drivers licenses, passports, etc.) are being validated, keywords/phrases might be "first name," "last name," "gender/sex," "birth date," "expiration date," "height," "weight," "eye color," etc. These are just examples, and any sort of document may be validated from a list of appropriate keywords and key phrases.

The WEVs of the keywords and key phrases may be generated using a pre-trained model (block 515). Words and phrases may be extracted from the document's text string, and the WEVs may be generated using the pre-trained model (block 520). The cosine distance may be calculated between the WEVs of the keywords/phrases and the extracted words and phrases (block 525). The extracted words and phrases of which the minimum cosine distance is below a prescribed threshold are kept as the extracted key value pairs (block 530).

A date parser application may be used to fetch document dates between date-related key value pairs (block 535). The difference may be calculated between the document's date (e.g., payment date, statement date, expiration date, etc.) and the submission date and/or the current date, if different (block 540). This may be used to assess the document's recency. For example, if a bank statement is being validated in support of a mortgage application, there may be a requirement that the statement is within the last 60 days relative to the submission date. This requirement may be a prescribed threshold for documents of this type. A determination is made to determine if recency is within the prescribed threshold (block 545). If yes, the document is determined to be valid (block 550), and a valid result is returned. If no, the document is determined to be invalid (block 555), and an invalid result or error result is returned.

Figure 6:
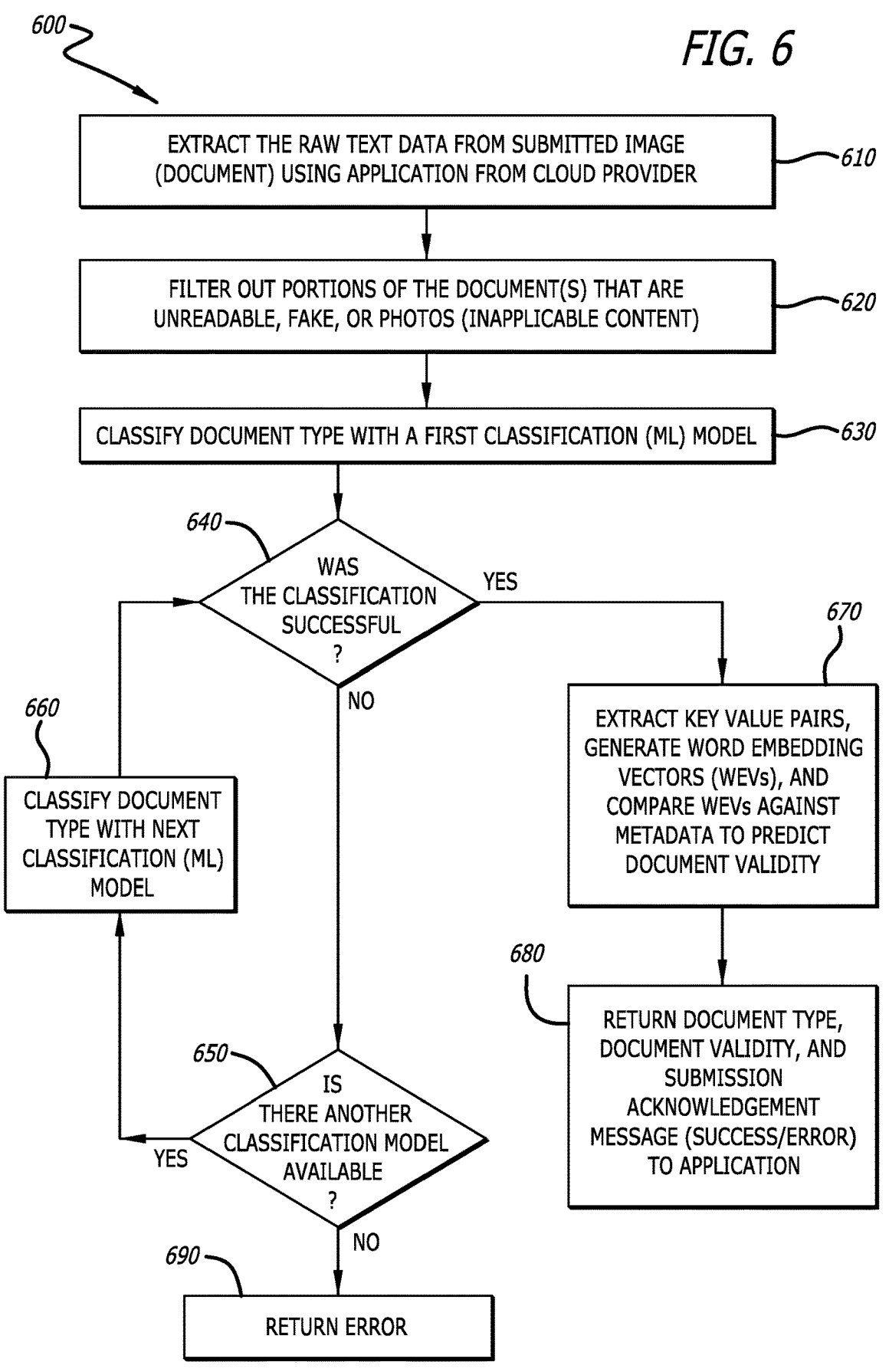
FIG. 6 is an exemplary flowchart of the operations of the ADIV system of FIG. 1 conducting pre-processing operations based on serial machine-learning (ML) model analytics.

Referring to FIG. 6, an exemplary flowchart of the operations of the ADIV system of FIG. 1 conducting pre-processing operations based on serial machine-learning (ML) model analytics is shown. Process 600 may begin by extracting raw text data from a submitted document image (block 610). This may be done using an application from a cloud provider or some other method. The document may be filtered to remove portions of the documents that are unreadable, fake, photos, or other inappropriate or inapplicable content (block 620).

One or more machine learning (ML) models may be used in series to classify the document. A first ML model may classify the document type (block 630). A determination is made if the document was successfully classified (block 640). If yes, then the key value pairs may be extracted, the word embedding vectors generated, and the WEVs then compared against the metadata to predict document validity (block 670), and the validated document type, the document validity, and a submission acknowledgment message (success/failure) may be returned to the application (block 680).

If no, a determination is made as to the availability of another ML model (block 650). If no, then an error is returned, and the process ends (block 690). If yes, then the document is classified using the next ML model (block 660). A determination is again made as to the successful classification of the document (block 640). The process 600 then continues as previously described, following block 640 above.

Referring to FIG. 7, an exemplary flowchart of the operations of the ADIV system of FIG. 1 conducting pre-processing operations based on concurrent machine-learning (ML) model analytics is shown. Process 700 may begin by extracting raw text data from a submitted document image (block 710). This may be done using an application from a cloud provider or some other method. The document may be filtered to remove portions of the documents that are unreadable, fake, photos, or other inappropriate or inapplicable content (block 720).

One or more machine learning (ML) models may be used in parallel to classify the document. A first ML model may classify the document type (block 730), a second ML model may classify the document type in parallel (block 740, and so on until an Nth ML model may classify the document in parallel (block 750). A determination is made if the document was successfully classified (block 760). If yes, then the key value pairs may be extracted, the word embedding vectors generated, and the WEVs then compared against the metadata to predict document validity (block 770), and the validated document type, the document validity, and a submission acknowledgment message (success/failure) may be returned to the application (block 780). If no, then an error is returned, and the process ends (block 790).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A method of operating a document validation system, the method comprising:

extracting words and phrases from content associated with a submitted, electronic document image;

attempting to classify a document type for the electronic document image using a first machine learning model of one or more machine learning models, wherein the document type includes one of an identification and a financial instrument;

attempting to verify the electronic document image has been classified as the one of the identification and the financial instrument, and if not verified, attempting to classify the document type using a machine learning model of the one or more machine learning models that is different from the first machine learning model to verify the document type;

identifying key value pairs from the extracted words and phrases using word embedding vectors (WEVs) and cosine similarity calculations;

determining the document validity using the key value pairs with one or more rules-based models;

returning document validity and verified document type in response to determining the document validity and verifying the type of the classified document; and returning an error result in response to failing to determine the document validity or failure to verify the type of the classified document.

2. The method of claim 1 further comprising:

submitting a document image through a portal;

passing non-rejected document images to an application; and requesting validation of the document from the document validation system through an application programming interface.

3. The method of claim 2 further comprising:

rejecting document images with inapplicable content.

4. The method of claim 1, wherein the attempting to classify operation further comprises:

running the machine learning models at least in part on an integrated circuit optimized for running machine learning models.

5. The method of claim 1, wherein the identifying operation further comprises:

providing a list of key phrases, each key phrase comprising one or more words;

generating word embedding vectors for the key phrases;

generating word embedding vectors for the extracted words and phrases;

calculating the cosine distance between the word embedding vectors of the key phrases and the word embedding vectors of the extracted words and phrases; and identifying the extracted words and phrases of which the minimum cosine distance is less than a prescribed threshold with respect to the key phrases as key value pairs.

6. The method of claim 5, wherein:

the word embedding vectors for the key phrases are generated using a pre-trained model; and the word embedding vectors for the extracted words and phrases are generated using the pre-trained model.

7. The method of claim 1, wherein the determining operation further comprises:

extracting dates from between key value pairs;

determining the recency of the document; and validating the document relative to the recency and a submission date.

8. The method of claim 1, wherein:

the types of documents to be classified and validated comprise at least one of the list consisting of: pay stubs, bank statements, driver's licenses, passports, leases, mortgages, and contracts.

9. The method of claim 1, wherein:

user metadata is used with the rules-based models to determine document validity.

10. The method of claim 1, wherein:

a document image is submitted from a computing device through a portal;

the portal sends the document image to an application; and the application submits the document image to the document validation system through an application programming interface.

11. The method of claim 10, wherein:

document validity and verified document type are returned through the application programming interface.

12. The method of claim 1, wherein:

the one or more machine learning models are applied in series until a document is successfully classified.

13. The method of claim 1, wherein:

the one or more machine learning models are applied in parallel.

14. A device, comprising:

a processor;

a memory; and a non-transitory storage medium comprising machine executable instructions executable by the processor, further comprising:

first instructions for extracting words and phrases from content from a submitted document image through an application programming interface, second instructions for classifying a document type of the submitted document image using one or more machine learning models, wherein the document type comprises one of an identification including a government identification and a financial instrument including a bank statement, a first machine learning model of the one or more machine learning models is directed to classifying the submitted document image as the bank statement and a second machine learning model of the one or more machine learning models is directed to classifying the submitted document image as the government identification,

third instructions for identifying key value pairs from the extracted words and phrases using word embedding vectors (WEVs) and cosine similarity calculations, fourth instructions for determining the document validity using the key value pairs with one or more rules-based models, fifth instructions for verifying the type of the classified document, and sixth instructions for returning document validity and verified document type.

15. The device of claim 14, wherein the processor is optimized for running machine learning models.

16. The device of claim 14, wherein the third instructions further comprise instructions for:

providing a list of key phrases, each key phrase comprising one or more words;

generating word embedding vectors for the key phrases;

generating word embedding vectors for the extracted words and phrases;

calculating the cosine distance between the word embedding vectors of the key phrases and the word embedding vectors of the extracted words and phrases; and identifying the extracted words and phrases of which the minimum cosine distance is less than a prescribed threshold with respect to the key phrases as key value pairs.

17. The device of claim 16, wherein:

the word embedding vectors for the key phrases are generated using a pre-trained model; and the word embedding vectors for the extracted words and phrases are generated using the pre-trained model.

18. The device of claim 14, wherein:

the document image is passed to the device through an application programming interface; and the document validity and verified document type are returned through the application programming interface.

19. A non-transitory storage medium comprising machine executable instructions, further comprising:

first instructions for extracting words and phrases from content from a submitted document image through an application programming interface, second instructions for classifying a document type of the submitted document image using one or more machine learning models, wherein each of the one or more machine learning models is directed to classifying a different document type and the document type includes an identification and a financial instrument, third instructions for identifying key value pairs from the extracted words and phrases using word embedding vectors (WEVs) and cosine similarity calculations, fourth instructions for determining the document validity using the key value pairs with one or more rules-based models, fifth instructions for verifying the type of the classified document, and sixth instructions for returning document validity and verified document type.

20. The non-transitory storage medium of claim 19, wherein the third instructions further comprise instructions for:

providing a list of key phrases, each key phrase comprising one or more words;

generating word embedding vectors for the key phrases;

generating word embedding vectors for the extracted words and phrases;

calculating the cosine distance between the word embedding vectors of the key phrases and the word embedding vectors of the extracted words and phrases; and identifying the extracted words and phrases of which the minimum cosine distance is less than a prescribed threshold with respect to the key phrases as key value pairs.

* * * * *